United States Patent
Jetten

(10) Patent No.: US 10,518,583 B2
(45) Date of Patent: Dec. 31, 2019

(54) INNER TUBE

(75) Inventor: Adolf Andreas Jetten, Moenchengladbach (DE)

(73) Assignee: GAADI BICYCLE TUBE GMBH, Moenchengladbach (DE)

(*) Notice: Subject to any disclaimer, the term of this patent is extended or adjusted under 35 U.S.C. 154(b) by 484 days.

(21) Appl. No.: 14/115,110

(22) PCT Filed: Apr. 27, 2012

(86) PCT No.: PCT/EP2012/057741
§ 371 (c)(1),
(2), (4) Date: Nov. 1, 2013

(87) PCT Pub. No.: WO2012/150187
PCT Pub. Date: Nov. 8, 2012

(65) Prior Publication Data
US 2014/0083587 A1    Mar. 27, 2014

(30) Foreign Application Priority Data
May 5, 2011   (DE) .................. 10 2011 100 562

(51) Int. Cl.
*B60C 5/04* (2006.01)
*F16L 11/04* (2006.01)
*B29D 22/02* (2006.01)

(52) U.S. Cl.
CPC .............. *B60C 5/04* (2013.01); *B29D 22/026* (2013.01); *F16L 11/04* (2013.01); *Y10T 152/10495* (2015.01)

(58) Field of Classification Search
CPC .... B60C 5/00; B60C 5/02; B60C 5/04; B60C 5/08; B60C 5/10
See application file for complete search history.

(56) References Cited

U.S. PATENT DOCUMENTS

| 175,357 A | 3/1876 | Lakey |
| 1,476,111 A * | 12/1923 | Simes .................. B60Q 5/04 |
| | | 152/511 |
| 2007/0125470 A1 | 6/2007 | VanCleave et al. |
| 2008/0223497 A1 | 9/2008 | Balzowski |

FOREIGN PATENT DOCUMENTS

| AT | 31915 | | 9/1907 |
| CN | 200951700 | * | 9/2007 |
| CN | 200951700 Y | | 9/2007 |
| CN | 201419613 Y | | 3/2010 |
| DE | 68027 | | 11/1891 |
| DE | 737816 | | 7/1943 |
| DE | 739648 | | 10/1943 |

(Continued)

OTHER PUBLICATIONS

Machine translation of WO 2006/018012, 2006.*

(Continued)

*Primary Examiner* — Justin R Fischer
(74) *Attorney, Agent, or Firm* — Dilworth & Barrese, LLP

(57) ABSTRACT

The invention relates to a tyre (1) for mounting on a running wheel, a rim or a guide which is circular, oval, ellipsoid or rounded in some other way and is not continuous but rather has at least two ends. The invention also relates to a method for manufacturing a corresponding tyre (1).

8 Claims, 2 Drawing Sheets

(56) References Cited

FOREIGN PATENT DOCUMENTS

| | | | |
|---|---|---|---|
| DE | 1684222 | | 9/1954 |
| DE | 3729670 A1 | | 3/1988 |
| DE | 29803621 U1 | | 6/1998 |
| DE | 19817046 A1 | | 10/1999 |
| DE | 19828412 A1 | | 12/1999 |
| DE | 10032300 A1 | | 1/2002 |
| DK | 1786635 T3 | | 4/2009 |
| EP | 1786635 B1 | | 5/2007 |
| GB | 190924398 | * | 12/1910 |
| GB | 718634 | * | 11/1954 |
| GB | 1423124 | * | 1/1976 |
| JP | 54-136005 A | | 10/1979 |
| WO | 9725215 A1 | | 7/1997 |
| WO | WO 2006/018012 | * | 2/2006 |

OTHER PUBLICATIONS

English translation of Tarnovsky v. N. et al., Automobile Tires; Device, Operation, Service, Repair. Moscow, Transport, 1990 pp. 42, 44, 243.

* cited by examiner

INNER TUBE

FIELD OF THE INVENTION

The invention relates to an inner tube for mounting on a wheel, a rim or a guide which is circular, oval, ellipsoid or rounded in some other way, which is not continuous but rather has at least two ends. The invention also relates to a method for manufacturing such an inner tube.

PRIOR ART

DE 298 03 621 U1 describes a bicycle tube which is characterized in that the tube is open, has an overlap on which an adhesive is provided, which is protected from drying by a protecting sheet. On the opposite side of the open tube, there is a fixing site without adhesive, and a bonding site with a protecting sheet that protects it from drying.

DE 1 684 222 describes a tire consisting of individual tube members in which individual tube members are attached to one another and surround the rim.

U.S. Pat. No. 175,357 describes improvements in the inner tubes of pneumatic tires, in which the ends of an open tube are provided with a fixing area throughout the cross-section of the contact areas. Because of the high material density in the region of the contact areas, such a tube in a casing is difficult to fill uniformly with pressurized air.

DE 37 29 670 A1 describes an inner tube with a detachable continuous connection in which a tube of pneumatic tires equipped with a valve has a tube end doubled by rolling in, wherein the two open tube ends are engaged into one another, similar to a socket joint.

AT 31 915 B describes a divided pneumatic tube for pneumatic tires, in which the ends of the tube are connected with each other in the way of a plug/coupling principle.

DE 92 02 345 U1 describes an inner tube for bicycle tires which is characterized in that an annular tube is divided at one point and is longer than the perimeter of the wheel. Its ends, which face one another, are closed and superimposed. The wall thickness of the superimposed tube ends is higher than the wall thickness of the tube.

DE 100 32 300 A1 describes an airtight inflatable tube for hard tires, wherein one tube end is engaged into a second tube end after the wheel tube has been inserted under the wheel casing into the necessary position.

DE 198 17 046 A1 describes a bicycle inner tube that is no longer closed in itself, in which the ends overlap when inserted into a bicycle casing. The overlapping ends are connected by a velcro-type fastener in order to prevent the overlap from slipping away. WO 97/25215 employs the technology of G9202345 U1 in principle. An analogous principle is also used in DE 739 848, which also describes a two-ended tube.

DE 198 28 412 A1 describes an inner tube for a tire and wheel. The inner tube for a tire, especially a bicycle tire, is characterized in that the tube has two end regions each with a closed end. In this case too, the relatively acute ends of the tube are to overlap within the casing, as can be seen from FIG. 2b. In FIGS. 4a and 4b, blunt tube ends are provided with an adhesive bonding means/holding device.

US 2008/0223497 A1 relates to an inner tube of a tire having first and second ends, wherein these ends are supposed to allow for replacing the tube without dismounting the tire. This tube consists of a pipe that is either bent or straight and has rounded end caps attached to the open ends of the pipe.

DE 737 816 describes a two-ended inner tube for bicycles in which the end caps and its two ends are made of a material that is more elastic than that of the remaining tube. The tube ends are joined in a sleeve. The spherical shape that forms prevents insertion into the sleeve.

The use of holding rings (i) and (h) results in a relatively rigid region in the course of the circular path of the tube, which in felt unpleasant when riding. Incidentally, this also holds for all the other two-ended tubes of the prior art, in which more or less large regions of the ends of the tubes overlap.

SUMMARY OF THE INVENTION

Accordingly, it is an essential object of the present invention to provide a wheel inner tube for complete mounting on a wheel, a rim or a guide which is circular, oval, ellipsoid or rounded in some other way, which is not continuous but rather has at least two ends, and in addition has no overlapping end regions of the wheel tube during the riding operation that would lead to an imbalance of the wheel because of an increased material thickness.

In the broadest sense the present invention comprises a wheel inner tube (1) for complete mounting on a wheel, a rim or a guide which is circular, oval, ellipsoid or rounded in some other way, which is not continuous but rather has at least two ends; wherein the ends of the tube (1) are each rounded with a bulge (2), characterized in that said ends of the tube (1) containing a bulge (2) are connected by an integral joint with the tube (1) each through one tube section (3).

In the broadest sense, the present invention also comprises a method for preparing an open wheel inner tube (1) with closed ends, characterized in that an end cap rounded with a bulge (2) is joined by injection molding to a non-vulcanized or partially vulcanized tube section (3), which is present on a mandrel with a bulge (2), which corresponds to the bulge (2) of the end cap, in a first step; the end cap and the tube section (3) are partially vulcanized in a second step; fourth step; and the wheel inner tube (1), the tube section (3) and the end cap with the bulge (2) are finally vulcanized in a fifth step; the same procedure being applied to the second end cap.

In the broadest sense the present invention also comprises a method for preparing an open wheel inner tube (1) with closed ends is characterized in that an end piece rounded with a bulge (2) is prepared from a tube section (3) and an end cap in a corresponding injection mold in a first step; the end piece is joined to the non-vulcanized or partially vulcanized wheel inner tube (1) in a second step; and the wheel inner tube (1) and the end piece are vulcanized in a third step; the same procedure being applied to the second end piece (2,3).

DESCRIPTION OF THE PREFERRED EMBODIMENTS

Figure 1B:
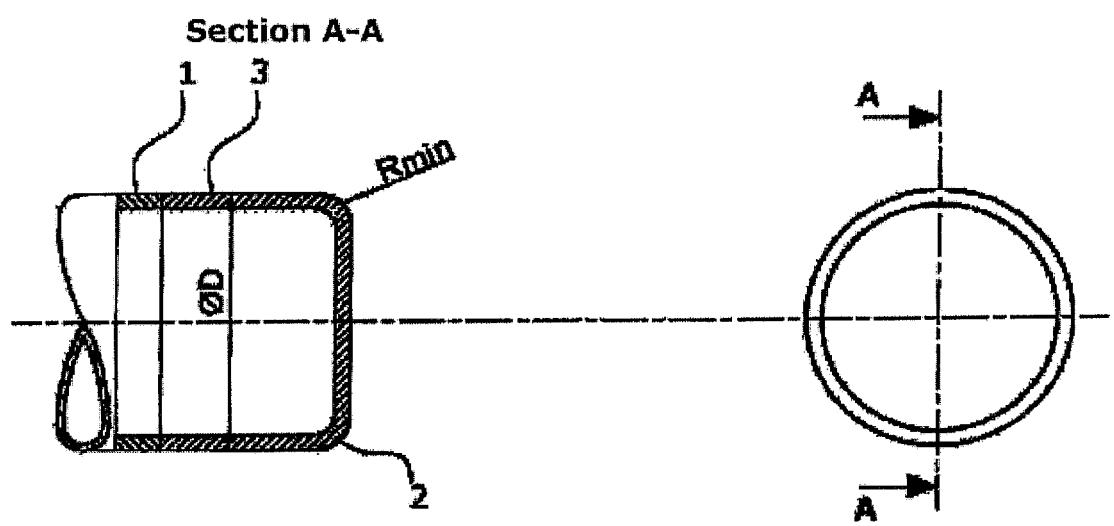
FIG. 1B shows a partial cross sectional view of a squared-off tube end taken along line A-A.
Figure 2:
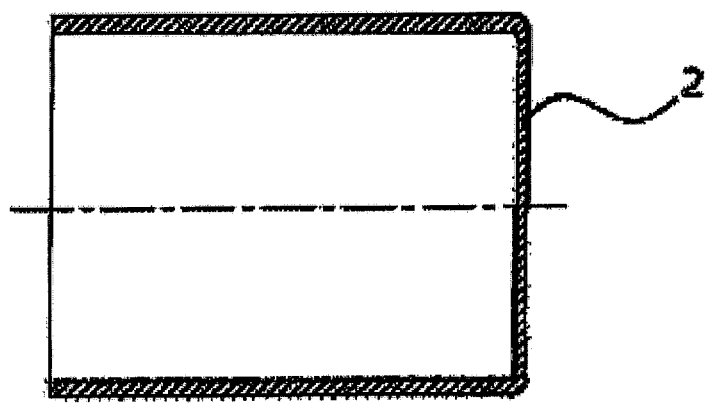
FIG. 2 shows a partial cross sectional view of an end plate tube end wherein the end plate wall is thinner than the tube wall.

In a first embodiment, the above mentioned object of the present invention is achieved by a wheel inner tube 1 for complete mounting on a wheel, a rim or a guide which is circular, oval, ellipsoid or rounded in some other way, which is not continuous but rather has at least two ends, characterized in that the ends of the tube are each rounded with a bulge 2, wherein said ends containing a bulge 2 are connected by an integral joint with the tube 1 each through one tube section 3. Preferably, the bulge 2 corresponds at most to the external radius of the tube and at least to one tenth, especially one fifth, of the external radius of tube 1. More preferably, the bulge is dome-shaped. However, this design has the disadvantage that the pressure necessary to fill the interior space of the casing is essentially higher. Therefore, the blunt shape as shown in FIG. 1B or 2 is preferred.

The insertion of a separate tube section 3 as a joining element between the wheel inner tube 1 and the end cap with the bulge 2 has the particular advantage that the end cap can be prepared separately and thus, for example, two blunt or dome-shaped end pieces of the wheel inner tube 1 or of the tube section 2 can be bonded to one another. This avoids imbalances in the region of the adhesive sites.

If pieces are "bonded together" within the meaning of the present invention, this means that the pieces are linked or joined together edge to edge.

In tedious experiments, the inventors of the present application found that an overlap of the two ends of the tube should be absolutely avoided. In addition, the contact area of the two tube ends within the casing should also have such a design that the material thickness of the end regions of the tube should essentially be as closely as possible to the material thickness of the rest of the tube. Also, the elastic properties of these end regions should be as closely as possible to or identical with those of the remaining regions of the tube. In order to realize an expansion performance of the end caps or end regions that is as close as possible to or identical with that of the tube body, the end cap or end region of the tube should have a high elasticity. Thus, a different stress state between the end region and the tube body (multiaxial stress state) can be reached. A more elastic end region is achieved either by an end cap or by an end region having a lower wall thickness (e.g., in the region of the cap bottom) or, for example, by using material mixtures that are softer as such. The formation of spheres by the tube ends is effectively prevented thereby, and the tube end can be displaced within the casing if necessary. In addition, an end region having a low elasticity (hard end cap) could lead to a noticeable resistance when rolling on a surface.

If the ends of the tube are made each with a rounded bulge (measured on the outside), which corresponds at most to the external radius of the tube and at least to one fifth, especially at least to one tenth, of the external radius of the tube, then no imbalance or no harder region of the tube appears when riding, which enables a clean rolling performance. The radius can be determined simply by pressing the tube together in an unfilled state and measuring the radius of the end regions.

A preferred embodiment of the invention consists of an inner tube having a blunt tube end that is closed with an essentially circular, oval or ellipsoid end plate. If the elasticity of the end plate is set to be higher than the elasticity of the remaining components of the tube, it will bulge when the tube is pumped up. Then, when the tube ends contact at the end of the pumping, the bulge is pressed back again, so that the two tube ends are facing edge to edge. For example, this embodiment can be realized by making the material thickness of the end plate thinner than that of the rest of the tube.

The material properties of the tube can be completely the same as the material properties of a bicycle inner tube as described in EP 1 786 635 B1. In this respect, this document is included herein by reference to the full extent thereof. Therefore, the regions referred to therein as the end caps of the tube, defined here as the ends of the tube, can be of the same material.

In a preferred embodiment, the wheel inner tube according to the invention is characterized in that the tube will proportionally expand more in the longitudinal direction than in cross-section while being filled. This phenomenon is basically known from modeling balloons. A corresponding setting of materials can be done in accordance with EP 1 786 635 B1.

As an alternative to the above mentioned variant, it is particularly preferred according to the invention that the tube will proportionally expand uniformly in the longitudinal and transverse directions. This is achieved, in particular, by having similar material properties, especially elasticity properties, of the ends of the tube and of the remaining regions of the tube including tube sections 3. If the absolute values of expansion are used, the expansion in the longitudinal direction is "absolutely" larger than that in the transverse direction.

Optionally, it is additionally possible that the tube 1 or parts thereof have fastening means and/or fixing means for fastening and/or fixing to a casing and/or rim. Also, according to the present invention, it is of course possible that the contact areas of the tube ends (end caps) have analogous means for fastening and/or fixing together.

Figure 1A:
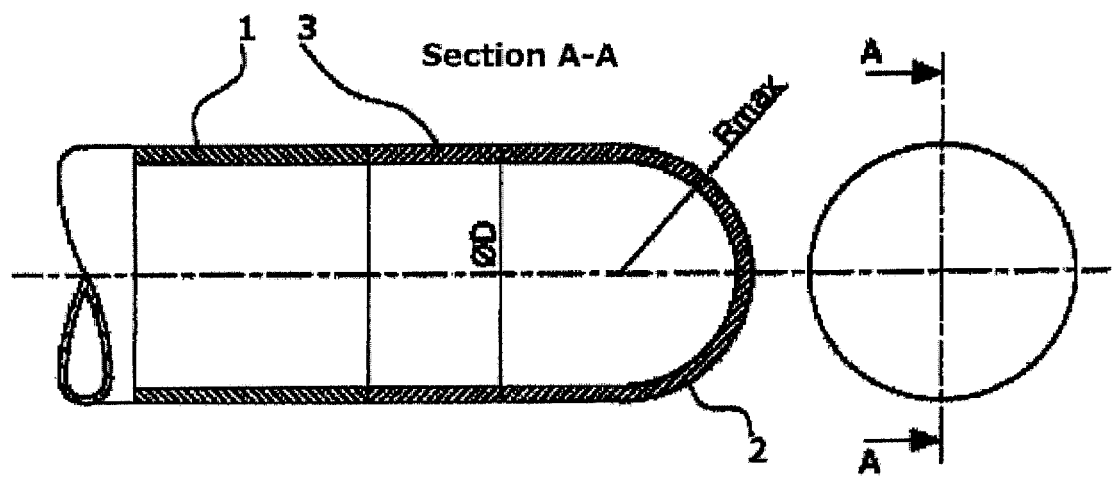
FIG. 1A shows a partial cross sectional view of a dome shaped view of a tube end taken along line A-A of the tube end.

FIG. 1 shows a wheel inner tube 1 according to the invention in which the end cap 2 is joined to the wheel inner tube 1 through the tube section 3.

Here, the radius of the bulge of the end cap 2 corresponds to the maximum radius of the tube with a dome-shaped tube end 2.

In contrast, in FIG. 1b, the wheel inner tube 1 is joined to the end cap 2, which shows the minimum radius of the bulge here, through the tube section 3.

Within the meaning of the present invention, it is of course also possible to prepare the end cap 2 separately in an injection mold and to join it directly to the wheel inner tube 1.

FIG. 2 shows the end piece of the wheel inner tube 1 according to the invention, which is prepared as a molded part by injection molding and joined to the wheel inner tube 1 (not shown) edge to edge.

Here, the material thickness of the end plate is thinner than that of the other parts of the end piece, which has the same material thickness as the wheel inner tube 1. Nevertheless, the necessary bulge of the end piece or of the end cap can be seen here too.

Another embodiment of the present invention includes a method for preparing the open wheel inner tube 1 with closed ends, characterized in that an end cap rounded with a bulge 2, for example, a dome-shaped one, is joined by injection molding to a non-vulcanized or partially vulcanized tube section 3, which is present on a mandrel with a bulge 2, which corresponds to the bulge of the end cap, in a first step;

the end cap and the tube section 3 are partially vulcanized in a second step;

the mandrel is withdrawn and the tube section 3 with the end cap is removed from the vulcanization mold in a third step;

the tube section 3 is joined to the non-vulcanized or partially vulcanized wheel inner tube 1 in a fourth step; and the wheel inner tube 1, the tube section 3 and the end cap with the bulge 2 are finally vulcanized in a fifth step;
the same procedure being applied to the second end cap.

In principle, this process variant is performed in such a manner that the tube section 3 is pulled over a mandrel, the latter is placed into the injection mold, and then the end cap is joined to the tube section by injection molding.

The separate preparation and connection of the end cap with a non-vulcanized or partially vulcanized tube section 3, which is present on a mandrel with a bulge 2, which corresponds to the a bulge of the end cap, has the particular advantage that an end piece is prepared in a simple way. If the non-vulcanized or partially vulcanized tube section 3 is subsequently joined to the wheel inner tube 1, which is also non-vulcanized or partially vulcanized, then it is possible to bond these two sections together and subsequently subject them to a final vulcanization.

The second end cap is correspondingly joined to a second non-vulcanized or partially vulcanized tube section, so that it is possible to connect either one or two tube sections at the same time with the wheel inner tube 1.

In another alternative embodiment, the method for preparing an open wheel inner tube 1 with closed ends is characterized in that an end piece rounded with a bulge 2 is prepared by injection molding from a tube section 2 and an end cap, and partially vulcanized in a first step;
the end piece is joined to the non-vulcanized or partially vulcanized wheel inner tube 1 in a second step; and
the wheel inner tube 1 and the end piece are finally vulcanized in a third step;
the same procedure being applied to the second end piece.

Thus, according to this variant, an end piece rounded with a bulge 2 is prepared separately and, in a non-vulcanized or partially vulcanized state, is joined to the non-vulcanized or partially vulcanized wheel inner tube 1, and finally vulcanized in a further process step.

Here too, it is of course possible to join the end pieces simultaneously or successively with the wheel inner tube 1 before the final vulcanization.

Further preparation methods include:
1) The tube is completely molded in a mold (in one piece or in partial sections), for example, by injection blow molding.
2) Alternatively to the complete injection molding or joining by injection molding of the end cap, for example, a circular end plate can be punched out of a butyl piece, and this circular end plate can then be bonded or vulcanized to the tube.

The invention claimed is:

1. A wheel inner tube for complete mounting on a rim, comprising:

a first tube having a uniform cross section of a first outer diameter, a first inner diameter, and first and second ends;

a second tube having a uniform cross section of the first outer and inner diameters and third and fourth ends, the third end of the second tube having been vulcanization bonded axially edge-to-edge against the first end of the first tube, and a first end cap having the first outer and inner diameters attached to the fourth end of the of the second tube, the first end cap having a circular end plate;

a third tube having a uniform cross section of the first outer and inner diameters and fifth and sixth ends, the fifth end of the third tube having been vulcanization bonded axially, edge-to-edge against the second end of the first tube and a second end cap having the first outer and inner diameters attached over the sixth end of the of the third tube, the second end cap having an end plate; and the first end cap joining the second end cap to form the circular inner tube of uniform cross section of the first outer diameter, the first inner diameter and no overlapping in the radial direction of the tube leading to increased material thickness.

2. The wheel inner tube of claim 1, wherein the first and second end caps comprise two blunt portions.

3. The wheel inner tube according to claim 1, characterized in that said end plates of the first and second end caps have a higher elasticity than that of the first, second or third tube.

4. The wheel inner tube according to claim 1, characterized in that said first tube will proportionally expand more in the longitudinal direction than in cross-section while being filled.

5. The wheel inner tube according to claim 1, characterized in that said first tube will proportionally expand uniformly in the longitudinal direction and in cross-section.

6. The wheel inner tube according to claim 1, characterized in that said first tube or parts thereof have fastening means and/or fixing means for fastening and or fixing to a rim.

7. The wheel inner tube according to claim 1, characterized in that the first, second and third tube have identical elasticity properties.

8. The wheel inner tube according to claim 1, characterized in that the end caps are joined to the second and third tube by injection molding.

\* \* \* \* \*